United States Patent [19]

Mettler

[11] Patent Number: 4,641,546
[45] Date of Patent: Feb. 10, 1987

[54] CRANKSHAFT ASSEMBLY FOR SMALL GASOLINE MOTORS

[75] Inventor: Karl Mettler, Triesen, Liechtenstein

[73] Assignee: Etablissement Supervis, Vaduz, Liechtenstein

[21] Appl. No.: 677,294

[22] Filed: Dec. 3, 1984

[51] Int. Cl.⁴ .............................................. F16C 3/10
[52] U.S. Cl. ..................................... 74/598; 29/6; 228/136; 228/168; 403/271; 403/273
[58] Field of Search ............... 29/6; 74/595, 597, 598; 403/271, 272, 273; 228/136, 168

[56] References Cited

U.S. PATENT DOCUMENTS

| | | | |
|---|---|---|---|
| 1,136,524 | 4/1915 | Hartwig | 74/598 |
| 1,504,238 | 8/1924 | Hildebrand | 74/598 |
| 1,518,610 | 12/1924 | Steenstrup | 29/6 |
| 1,860,607 | 5/1932 | Causer | 74/598 |
| 2,235,450 | 3/1941 | Groene | 29/6 |
| 2,364,109 | 12/1944 | Taylor | 74/598 |
| 2,378,686 | 6/1945 | Carstens | 29/6 |
| 3,599,509 | 8/1971 | Romer | 74/598 |
| 4,015,908 | 4/1977 | Ashley | 29/6 |

FOREIGN PATENT DOCUMENTS

| | | |
|---|---|---|
| 232725 | 3/1911 | Fed. Rep. of Germany . |
| 347103 | 1/1922 | Fed. Rep. of Germany . |
| 364371 | 11/1922 | Fed. Rep. of Germany . |
| 422828 | 12/1925 | Fed. Rep. of Germany . |
| 542056 | 1/1932 | Fed. Rep. of Germany . |
| 623469 | 12/1935 | Fed. Rep. of Germany . |
| 822036 | 11/1951 | Fed. Rep. of Germany . |
| 891641 | 10/1953 | Fed. Rep. of Germany . |
| 1049163 | 1/1959 | Fed. Rep. of Germany . |
| 1189803 | 3/1965 | Fed. Rep. of Germany . |
| 1270893 | 6/1968 | Fed. Rep. of Germany . |
| 3123114 | 12/1982 | Fed. Rep. of Germany ............ 29/6 |

Primary Examiner—George L. Walton
Attorney, Agent, or Firm—Toren, McGeady and Goldberg

[57] ABSTRACT

In the formation of a crankshaft, such as used in small gasoline motors for lawn motors, chain saws and the like, separately produced crank webs, shaft pins and crank pins are used to form an integral crankshaft. Initially the various parts are shaped to the desired dimensions. The crank web can be stamped from a metal strip or it can be a forged sintered part. A shaft pin is inserted in sliding contact with an opening in a crank web and then the two parts are secured together by pressure welding. Another crank web and shaft pin are assembled in a similar manner. The two webs are then interconnected by a crankpin positioned in another opening in each of the webs and a connecting rod is installed on the crankpin.

7 Claims, 7 Drawing Figures

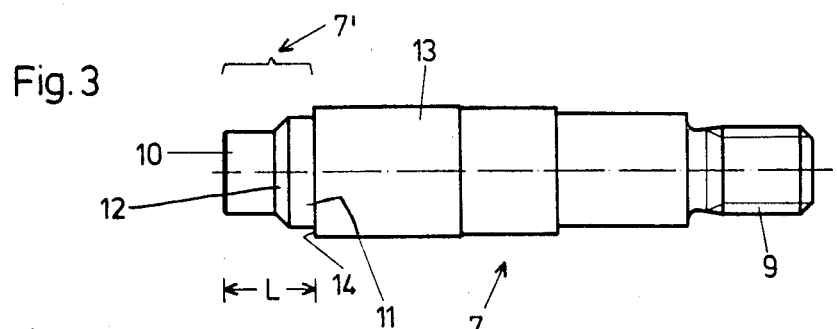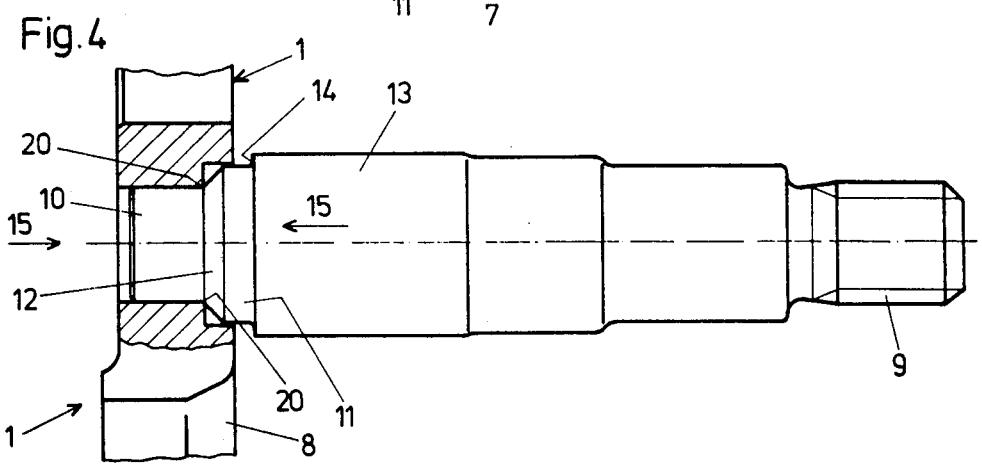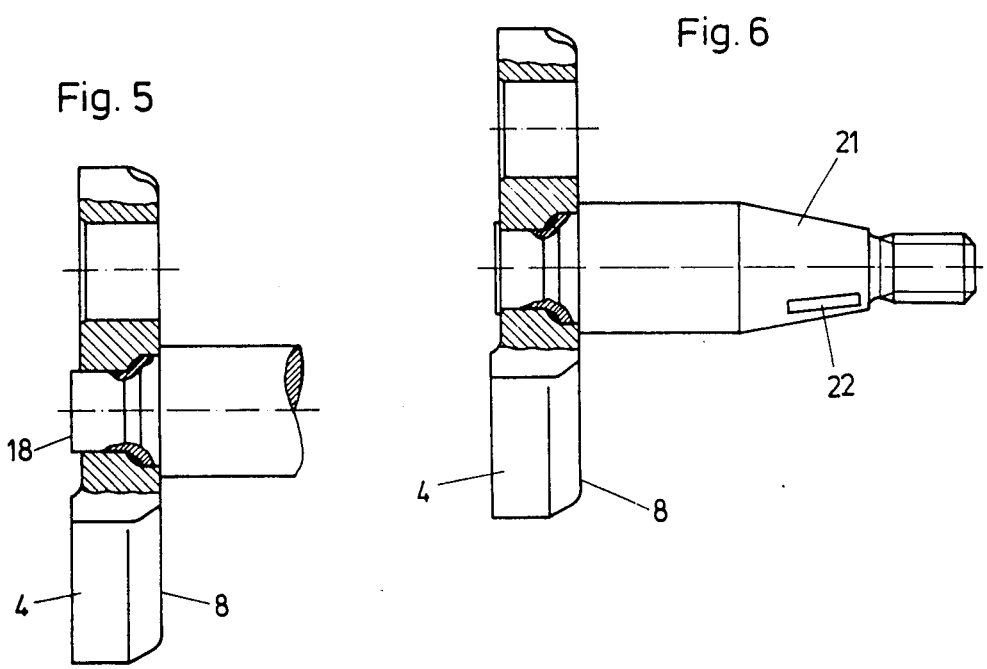

CRANKSHAFT ASSEMBLY FOR SMALL GASOLINE MOTORS

BACKGROUND OF THE INVENTION

The present invention is directed to a crankshaft assembly, such as used in small gasoline motors for driving lawn mowers, chain saws, two-wheel vehicles, motor-driven hand tools and the like, where the crankshaft is assembled from at least one shaft pin, at least one crankshaft web, and at least one crank bolt with these parts being fabricated as separate members and subsequently assembled together as an integral unit. Such crankshafts for small gasoline motors are usually mass-produced parts, manufactured in large numbers.

It has been known to fabricate the parts making up a crankshaft as separate members and then to join them together, such as by a press or shrink fit. It is also known to weld the parts of a crankshaft after they have been interconnected in a shrinking operation. Further, in the formation of crankshafts, the crankshaft webs have been formed from a softer material than the shaft pin and crankpin, and serrations have been formed in the pins so that during assembly the pins are pressed into the softer material of the web for obtaining a closely interfitting connection between highly stressed parts. Rather than using serrated surfaces, extruded connections between the crank web and the pins are known with the pins being pressed into a web opening of smaller diameter containing grooves extending in the axial direction of the opening. Moreover, it is known in the art to interlock the individual parts of the crankshaft assembly with each other by means of pins or wedges.

In these various known crankshaft assemblies, the separately fabricated parts, based on their shape, are either cast or produced on lathes and the crankshaft assemblies made up of multiple parts are preferably used in machines with large volume displacements. Such a crankshaft construction has been provided where the crankshaft and the connecting rod have been supported in roller bearings. It was the purpose of these crankshaft assembly arrangements to simplify handling during the fabrication of the individual parts and also during the assembly operation.

SUMMARY OF THE INVENTION

The primary object of the present invention is to provide a crankshaft assembly primarily intended for use in small gasoline motors. Such small gasoline motors serve to power or drive motor-driven tools, such as chain saws, lawn mowers, small two-wheel vehicles, such as mopeds, and similar apparatus. Such crankshafts embodying the present invention are relatively small structural parts with regard to their mass as well as their dimensions. In the past it has been expedient to produce such crankshafts as a monolithic member, since the individual fabrication of the parts making up the crankshaft was not considered feasible because of economic considerations. Though a crankshaft for a small gasoline motor is only a small machine element, this element must satisfy particularly high precision requirements rendering its production quite costly.

The present invention is intended to simplify the fabrication of small though highly precise parts so that the production is less costly and is achieved by forming the crank webs with openings therethrough for receiving the shaft pins and crank pins by stamping the webs from strip steel or forming them as forged sintered parts. The shaft pins and/or crank pins are formed from cylindrical blanks in an extrusion process. The separate fabrication of the individual parts making up the crankshaft are formed of such small dimensioned parts that it would not be obvious to a person skilled in the art to produce the crankshaft from individual parts, since completely different processes have been used for making such crankshafts. In the present invention, rolled or drawn strip steel is used to form the crank web or the web is constructed as a sintered forging. In forming the web, openings are provided for receiving the shaft pins and crank pins so that the webs are produced in a single working operation. The individual parts are subsequently subjected to a heat tempering treatment exactly tailored to the particular features and requirements of the part.

The same operations are used if the web is manufactured in a sintered forging operation. Stamped webs are preferred if the web has a simple shape, such as webs with planar side faces. If the webs have a complicated shape such as is required for balancing the mass, then the webs are fabricated as sintered forgings.

The shaft pins and/or crank pins are formed from cylindrical blanks in an extrusion operation. The pins thus formed have, to a large extent, the desired shape and size and can be further machined on automatic equipment, for forming threads or grooves and grinding operations can also be performed on such automatic equipment. Further, a partial hardening of individual sections of the pins is also possible. The parts making up the crankshaft are thus individually produced with the desired finished dimensions.

The webs and pins fabricated using entirely different procedures are then assembled together using automatic equipment with the individual parts being pressure-welded together. The parts formed with their finished dimensions are not disadvantageously influenced by pressure welding and, accordingly, reworking of the parts is unnecessary. By pressure-welding is meant the union of metallic materials under pressure with locally limited heating. Electric resistance heating is particularly suitable for such an operation.

To increase the strength of the connection between a shaft pin and crankshaft web, as a further feature of the invention, the end face of the shaft pin just projecting through the web can be pressed into engagement with the web. Such a pressing operation is suitably accomplished immediately following the pressure-welding step. Accordingly, it is advantageous if the axial length of the opening in the web for receiving the end part of the shaft pin is slightly smaller than the axial length of the corresponding end of the shaft pin. Therefore, with the two parts in interengagement, a short axial section of the pin extends from the face of the web and the outwardly extending section is subject to hot pressing to provide the desired deformation.

In performing the pressure-welding operation, another characteristic of the invention is that the opening in the crankshaft web in which a shaft pin is received is made up of two axially extending sections each having a different diameter. The larger diameter section is adjacent the face of the web into which the end of the pin is inserted. The section of the pin inserted into the larger diameter opening has a tapered shoulder which initially forms a line contact with the transition between the two different diameter sections. Due to this feature, favorable conditions are present for pressure-welding and the line contact present at the commencement of the welding operation assures a high transient electric resistance which is preferable for an effective and rapid completion of the pressure-welding step.

To ensure a precise axial displacement of the shaft pin relative to the web during the pressure-welding operation, the provision of a tapered section on the shaft pin, following the section of the pin in sliding contact with the opening, affords an abutment shoulder. During the welding step, the shaft pin moves axially, due to the pressure applied, until the abutment shoulder fits against the web or against a distance ring so that the axial displacement takes place along a precisely defined path.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

FIG. 3 is an axially extending side view of a shaft pin;

FIG. 4, the shaft pin shown in FIG. 3 is illustrated on an enlarged scale and is inserted into the web in preparation for the pressure-welding operation;

FIG. 5 is a partial view of the parts shown in FIG. 4, on a reduced scale, after the completion of the pressure-welding step;

FIG. 6 is a view similar to FIG. 5 after the hot pressing of the end of the shaft pin against the web.

DETAILED DESCRIPTION OF THE INVENTION

Figure 1:
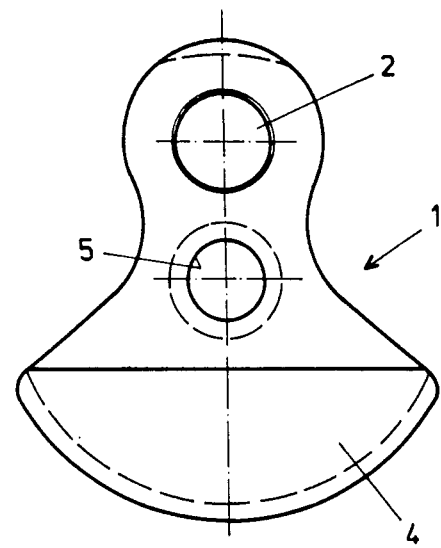
FIG. 1 is an elevation view of a web in accordance with the present invention.
Figure 2:
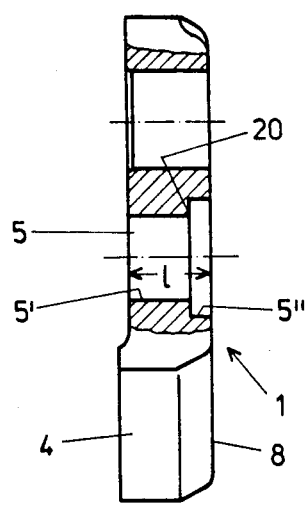
FIG. 2 is a side view, partly in section, of the web shown in FIG. 1.

In FIGS. 1 and 2, a web 1, fabricated as a sintered forging, is shown and the web includes an increased thickness section 4 for mass balance at the lower half of the web, that is, on the opposite side of the opening 5 from the opening 2 intended for the crankpin 3. The central opening 5 intended to receive the shaft pin 7 is divided in the axial direction into two different diameter sections 5' and 5". The section 5" has a larger diameter and adjoins the outer side of the web 1. The smaller diameter section 5' extends from the larger diameter section 5" to the inner side of the web 1. The axial length of the larger diameter section 5" is smaller than the axial length of the smaller diameter section 5'. The larger diameter section 5" is formed in the sintered forging operation. If the web is formed from strip steel in a stamping or punching operation, the larger diameter section 5" is achieved in a chip removing operation, such as by milling.

Figure 7:
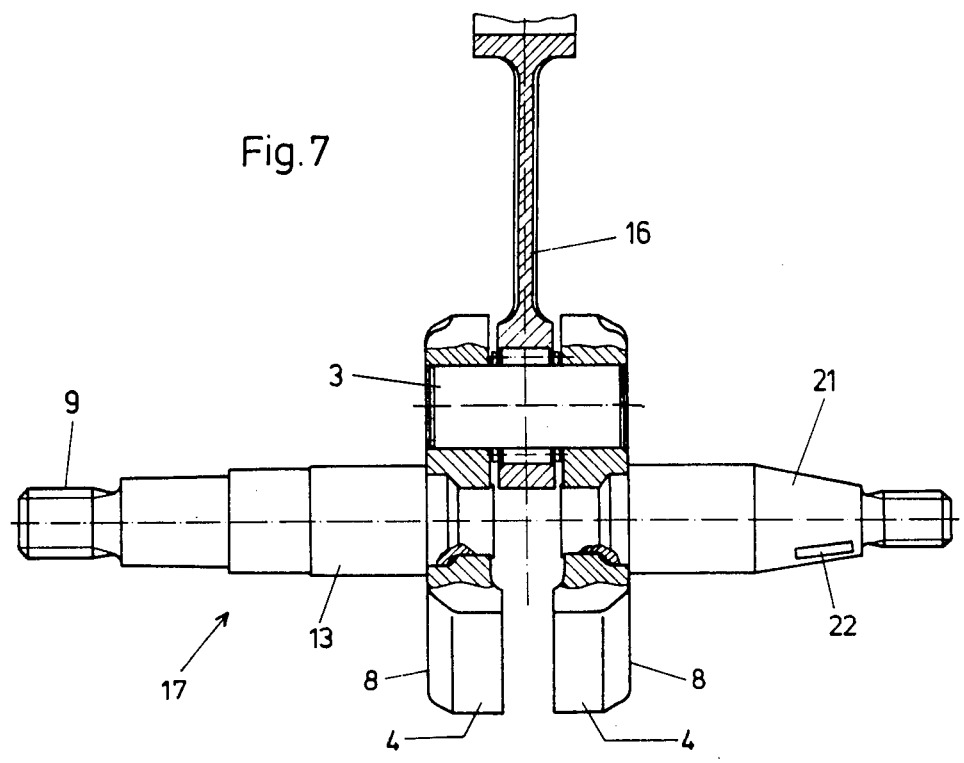
FIG. 7 is a side view, partly in section, of a crankshaft assembly embodying the present invention and shown partly in section.

As can be seen in FIG. 7 there are two shaft pins, one pin 7 as illustrated in FIG. 3 and another pin 17. Shaft pin 7 is formed in an extrusion operation and subsequently it is machined to the shape shown in FIG. 3 where a thread 9 is formed on one end. In addition, the surfaces of the pin can be ground. During these operations, shaft pin 7, as an individual part, is finished to its final dimension. In shaping the pin, a heat treatment can also be effected. These various processing steps, whatever they may be, are carried out on the individual part produced in an extrusion operation. One axially extending end section 7' of the shaft pin 7 is to be inserted into the opening 5 in the web 1. The end section 7' is to be formed of two different diameters. A smaller diameter section 10 extending from the end of the pin followed by the larger diameter section 11 with the two sections spaced axially apart by a conically tapered shoulder 12. A larger diameter axially extending shaft section 13 follows the shaft section 11 so that a right angled shoulder 14 is provided between the section 11 and the section 13 on the shaft pin. The function of the shoulder 14 will be explained later. The various steps carried out in forming the shaft pin 7 shown in FIG. 3 can also be performed in the formation of the shaft pin 17, note FIG. 7, accordingly, the description of the formation of the shaft pin 17 is not necessary.

With the shaft pin 7 shaped as shown in FIG. 3 the left hand end section formed by the section 10 is inserted into the opening 5 in the web 1. As the pin 7 is inserted into the opening 5, the tapered shoulder 12, at its smaller diameter, seats against the edge 20 defining the transition between the smaller diameter section 5' of the opening and the larger diameter section 5". The diameter of the opening section 5' and the diameter of the shaft end section 10 on the pin 7 are selected so that the two parts are in sliding contact with one another and the sliding contact can be effected without the application of any particular force. With the pin 7 inserted into the opening 5 in the web 1 the two parts can be secured together by pressure welding with the parts being locally heated in the region of their linear edge contact, that is, around the edge 20. Due to the heat applied, the juxtaposed surfaces of the web and the pin become plastic and the parts in sliding contact with one another due to the pressure force applied in the direction of the right hand arrow 15 in FIG. 4, results in the shoulder 14 moving toward the juxtaposed surface of the web 1 until it abuts against the outer side 8 of the web. It would be possible to insert a distance ring or a distance spacer of precise thickness between the shoulder 14 and the outer side of the web 1 if such a part is required. As viewed in FIG. 4, the pin is ready to be displaced in sliding contact with the surface of the opening 5 in the web in the direction of the right-hand arrow 15. Upon the completion of the axial displacement in the left-hand direction as viewed in FIG. 4, the relative positions of the web 1 and the pin 7 are shown in FIG. 5.

To augment the strength of the connection, the end section 18 of the shaft pin 5 projecting from the inner side of the web 1 can be hot pressed so that it is deformed due to the application of locally limited pressure whereby it assumes the position of the shaft end as shown in FIG. 6. During the pressing operation, clearance spaces between the cylindrical walls of the opening 5 and the section 10 of the pin are filled with material.

The second web and the second shaft pin 17, note FIG. 7, are assembled together in a similar manner. Subsequently, possibly after a further machining of the opening 2, crankpin 3 is inserted in the webs and the connecting rod 16 is installed. A keyway 22 can be provided in the conical section 21 of the right-hand pin as viewed in FIG. 7 and also as shown in FIG. 6.

As described above, the crank web is a forged sintered part. If the web has the same thickness over its entire extent, so that it has a simple shape, it can be fabricated by a stamping process from steel strip as the starting material. In the stamping operation the openings in the web for receiving the shaft pin and the crankpin can also be produced.

Based on the present invention, it is possible to reduce considerably the production costs for a crankshaft to be used in small gasoline motors even though the parts making up the crankshaft are produced separately by considerably different production operations. Accordingly, the result would be surprising to a person skilled in the art even considering the prior art described above, since these mass produced parts were previously manufactured as monolithic members which involved an extremely expensive production operation. The present invention is surprising even in the face of the tendency in industry to attempt to produce parts as inexpensively and effortlessly as possible without adversely affecting the function and reliability of the parts. Accordingly, notwithstanding the extensive state of the art discussed above, the invention would not be obvious to the person skilled in the art.

While specific embodiments of the invention have been shown and described in detail to illustrate the application of the inventive principles, it will be understood that the invention may be embodied otherwise without departing from such principles.

I claim:

1. Crankshaft, such as used in small gasoline motors for lawn mowers, chain saws, two-wheeled vehicles, motor-driven hand-tools and the like, comprising at least one shaft pin, at least one crank web and at least one crank bolt, each said shaft pin, crank web and crank bolt being formed as a separate member, said web is provided with axially extending openings therethrough, said shaft pin is inserted into one of said openings and said crank pin into the other said opening and said pins are integrally interconnected with said web, said crank web is formed of one of a stamped strip metal and a forged sintered part, said shaft pin and crankpin are shaped from cylindrical blanks in an extrusion operation, said shaft pin and crankpin are weldably connected to said crank web, wherein the improvement comprises that said web has an outer face and an inner face, said openings in said web comprise a first opening for said at least one shaft pin and a second opening for said crankpin with said first opening having a first axially extending section extending from said inner face toward said outer face and a second axially extending section coaxial with said first axially extending section and extending from the end of said first axially extending section spaced from said inner face to said outer face, said first axially extending section having a smaller diameter than said second axially extending section, the end of said second axially extending section adjacent said first axially extending section forms a first annular shoulder extending substantially perpendicularly to the axis of the opening and facing toward said outer face, a first end of said shaft pin has a first axially extending section extending from the first end thereof toward a second end and a second axially extending section coaxial with and extending from said first axially extending section toward the second end of said shaft pin, said shaft pin having a radially outwardly extending second shoulder at the end of said second axially extending section thereof spaced from said first axially extending section, said second shoulder extending substantially perpendicularly of said shaft pin axis and radially outwardly from said second axially extending section of said shaft pin, said first axially extending section of said shaft pin having a diameter corresponding to the diameter of the first axially extending section of said first opening and said second axially extending section of said shaft pin having a diameter corresponding to the diameter of said second axially extending section of said first opening so that said shaft pin fits in sliding engagement within the first opening in said web, said shaft pin has an axially extending conically tapered shoulder between the adjacent ends of said first and second axially extending sections of said shaft pin whereby said shaft pin is insertable into the first opening until the smaller diameter end of said conically tapered shoulder contacts in circular line contact the radially inner edge of said first shoulder in said first opening and thereby defining a triangular space therebetween, said shaft pin is forcibly axially displaceable relative to said first opening until said second axially extending section of said shaft pin is in complete contact with said second axially extending section of said first opening for the axial length thereof to said second shoulder at the end of said second axially extending section of said shaft pin spaced from said first axially extending section thereof, and at the same time permitting the tapered shoulder to be deformed into said triangular space and in abutting contact with said first shoulder so that when said wed and said first and second diameter sections of said shaftpin is heated, a weld connection is defined at the area of the deformation of said tapered shoulder.

2. Crankshaft, as set forth in claim 1, wherein the axial length of the first opening in said web is less than the axial length of the first and second axially extending sections of said shaft pin so that in the fully inserted and interconnected condition the end of said shaft pin at the end of the first axially extending section thereof spaced from the second axially extending section thereof is spaced outwardly from the inner side.

3. Method of forming a crankshaft, such as used in small gasoline motors for powering lawn mowers, chain saws, two-wheel vehicles, hand tools and the like, made up of at least one axially extending shaft pin, at least one crank web and at least one axially extending crank pin, and comprising steps of forming said crank web with an inner side and an outer side and a first opening and a second opening each extending axially between the inner and outer sides, forming the first opening in said web with a first axially extending section extending from the inner side toward the outer side and a second axially extending section extending from the outer side toward the first axially extending section with a first shoulder extending perpendicularly of the axis of the opening at the end of said second axially extending section adjacent said first axially extending section, shaping said shaft pin with axially extending sections of different diameters with one end of said shaft pin having an axially extending first diameter section followed in the direction toward the other end by an axially extending second diameter section with the second diameter section having a larger diameter than the first diameter section and then followed by a third diameter section larger than said second diameter section, a conically tapered section extending axially between said first and second diameter sections and a radially extending second shoulder defining a triangular space therebetween and being disposed perpendicularly of the axis of said shaft pin at the junction between said second diameter section and said third diameter section, forming the diameter of the first and second diameter sections corresponding to the diameter of the first and second axially extending sections of the first opening in said web, respectively, forcibly inserting the first diameter section of said shaft pin into sliding contact with the first opening in said crank web until the smaller diameter end of said conically tapered section is deformed into said triangular space and in abutting contact with the radially inner edge of said shoulder, heating both said web and the first and second diameter sections of said shaft pin in the region of the opening until the heated parts of said web and said shaft pin become plastic, and pressure-welding the web and shaft pin at the area of the deformation of said tapered shoulder together until the shoulder between the second diameter section and the third diameter section abuts against the outer side of said web and installing the crank pin through the second opening in said web.

4. Method, as set forth in claim 3, pressing the one end of said shaft pin through said opening in said crank web so that said one end projects slightly outwardly from the inner side of said crank web, and deforming the projecting one end of said shaft pin into engagement with the adjacent surface of said web.

5. Method, as set forth in claim 3, including the step of forming said crank web as a sintered forging with the openings formed therein.

6. Method, as set forth in claim 3, including the step of forming said crank web by stamping the crank web from a strip of sheet metal and forming the openings in the crank web in a stamping operation.

7. Method, as set forth in claim 3, wherein the crankshaft is formed of two shaft pins, two crank webs, and one crank pin, interconnecting said webs by inserting the crankpin into the second openings in each of said webs, and installing a connecting rod on said crankpin between said webs.

* * * * *